Oct. 6, 1925.
C. W. MENSING
1,555,926
INDICATOR FOR MEASURING PUMPS
Filed Dec. 17, 1921 3 Sheets-Sheet 1
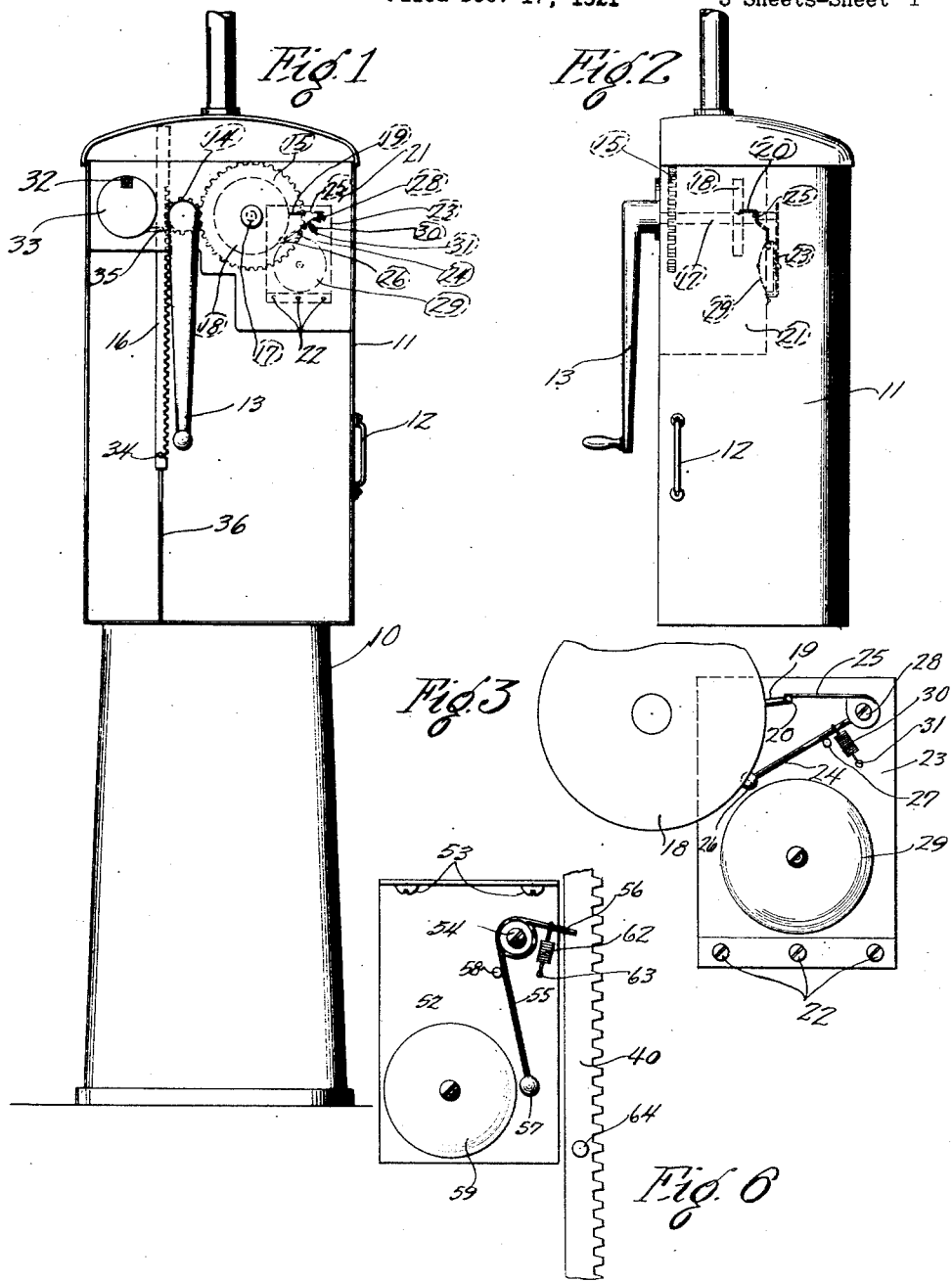

Oct. 6, 1925.
C. W. MENSING
1,555,926
INDICATOR FOR MEASURING PUMPS
Filed Dec. 17, 1921     3 Sheets-Sheet 2
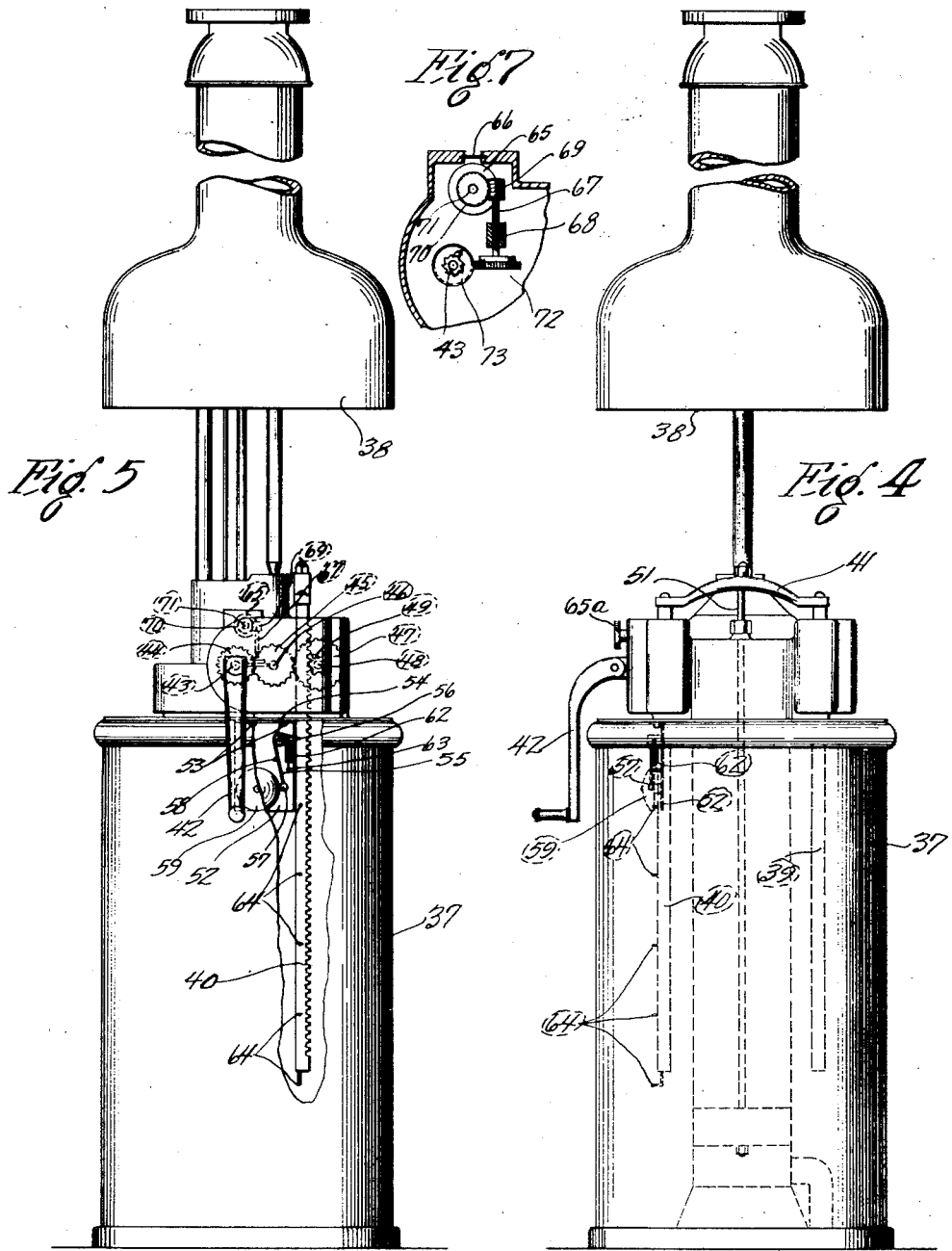
Witness
J. L. Brown
Inventor
Clarence W. Mensing
By Sprinkle Hopkins & McNair
Attys.

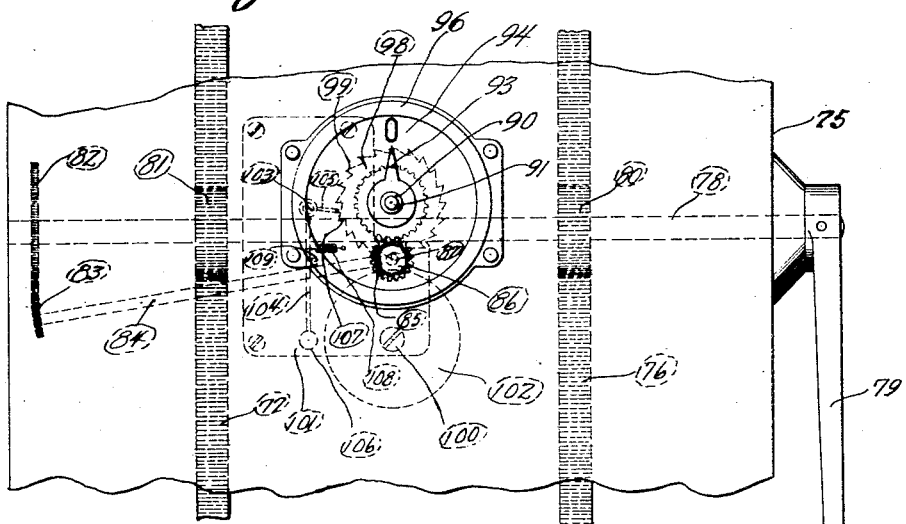

Patented Oct. 6, 1925.

1,555,926

UNITED STATES PATENT OFFICE.

CLARENCE W. MENSING, OF FORT WAYNE, INDIANA, ASSIGNOR TO S. F. BOWSER & CO., INC., A CORPORATION OF INDIANA.

INDICATOR FOR MEASURING PUMPS.

Application filed December 17, 1921. Serial No. 523,076.

*To all whom it may concern:*

Be it known that I, CLARENCE W. MENSING, a citizen of the United States, residing at Fort Wayne, in the county of Allen and State of Indiana, have invented certain new and useful Improvements in Indicators for Measuring Pumps, of which the following is a specification.

My invention relates to indicators for measuring pumps, such as for instance pumps for dispensing oils where the oil is automatically measured by the pump, and the invention has for its primary object the sounding of an audible indicator or signal when a given amount of oil has been measured by the pump.

It is a further object of the invention to combine with the mechanism for moving the visible indicator of a registering device of such pumps an audible indicator or signal adapted to be sounded simultaneously with the registering by the visible indicator of a given amount of oil measured by the pump.

Other objects of the invention will appear from the following description, which is directed to the preferred embodiment of the invention, and as shown in the accompanying drawings forming a part of the specification, and pointed out more particularly in the appended claims.

While my invention contemplates the sounding of a gong, a bell, a buzzer or other sound producing device, I have described and shown it as applied with a gong.

In the said drawings Fig. 1 is an elevation view of a pump having a single rack bar for actuating the plunger rod with the casing opened showing my audible indicator or signal attached to the pump.

Fig. 2 is an elevation view of the upper portion of a pump as shown in Fig. 1 and taken at right angles thereto.

Fig. 3 is an enlarged detail view of a gong signal or indicator and its related parts.

Fig. 4 is an elevation view of a type of pump having two rack bars connected at their upper extremities by a yoke for operating the pump plunger, the top of the pump casing being in raised position, and showing the invention applied to the pump.

Fig. 5 is an elevation view of the pump shown in Fig. 4 taken at right angles thereto with a portion of the casing broken away to show one of the rack bars and my invention as related thereto.

Fig. 6 is an enlarged detail view of the indicator or gong and its associated parts showing their relation to the rack bar with portions of the rack bar broken away.

Fig. 7 is a fragmental sectional view of the housing showing the gearing for rotating the registering drum.

Fig. 8 is a fragmental elevational view of a part of another type of double rack bar pump showing the gearing for operating the indicator on the graduated dial.

Fig. 9 is a view of the same mechanism taken at right angles to Fig. 8.

In Figs. 1 and 2 I show a pump comprising an outer casing 10 having a sliding door 11 at the upper portion thereof, which door is provided with an operating handle 12. Suitably journalled in the upper portion of the pump frame is a shaft operated by crank handle 13, which shaft carries spur gear 14 meshing with gear 15 and rack bar 16.

All of the mechanism thus far referred to is old and forms no part of my invention.

I will now proceed to describe my audible indicator or signalling device as applied to the pump above referred to. Suitably geared to the pump mechanism above referred to is a shaft 17, which is journalled in the upper portion of the frame and carries drum 18 adapted to rotate with the shaft. The drum 18 carries on its periphery signal actuating stud 19 having angular terminal portion 20. Affixed to the pump frame 21 within the casing 10 by bolts 22 or other suitable means is supporting bracket 23 on the upper portion of which is pivotally mounted a hammer arm 24 made of resilient or spring material, which terminates at its upper end in finger 25, and carrying at its lower end hammer or striker 26. Bracket 23 carries stud 27 intermediate the pivot point 28 of arm 24 and gong 29 in such position as to limit the downward movement of arm 24 and hold the hammer or striker 26 in spaced relation to the gong 29. Finger 25 lies in the path of movement of the stud terminal 20 of drum 18 so that when drum 18 is rotated by the operation of the pump handle 13 the stud terminal 20 of drum 18 contacts with finger 25, thereby drawing arm 24 upwardly against the tension of spring 30, which is attached at one of its ends to arm 24 and to stud 31 of bracket 23 at its other end. When finger 25 becomes disengaged from terminal 20 of stud 19 carried by the drum 18 by the further rotation of the drum, arm 24 will be snapped downwardly by the tension of spring 30, causing the arm 24 to forcibly contact with stud 27, which will cause the arm to flex and strike gong 29 with hammer 26, the hammer being instantly withdrawn from the gong by reason of the flexibility of arm 24, thus producing a sharp, distinct sounding of the gong simultaneously with the appearing through sight glass 32 of the quantity of oil measured by the pump and indicated on the dial rotatably mounted within casing 33, the dial being rotated by the contacting of stud 34, carried by rack bar 16, with the finger 35, which is adapted to rotate the dial as the rack bar 16 approaches the limit of its upward movement in the completion of the upward stroke of the plunger rod 36 attached to the lower extremity of rack bar 16.

In Figs. 4 and 5 I have shown diagrammatically within the usual casing 37 having hood 38 a pump of the plunger rod type having two rack bars 39, 40, which are yoked at their upper extremities by yoke 41, the pump having the usual operating handle 42, rigidly affixed to shaft 43. Shaft 43 carries thereon spur gear 44, meshing with intermediate gear 45 carried by shaft 46, which last mentioned gear meshes with gear 47, carried by shaft 48. Shaft 48 carries at its outer ends small toothed gears as 49, meshing with rack bars 39 and 40, which rack bars are adapted to operate the pump plunger rod 51. The structure of the pump proper in Figs. 4 and 5 being old, forms no part of my audible signalling device, but is shown and referred to in general in order to more clearly illustrate the application of my invention thereto.

I will now proceed to specifically describe a modification of my indicating gong as applied to a pump of the structure just referred to. The reference character 52 indicates a supporting plate or bracket which is affixed to the crown of the casing 37 by screws or bolts as at 53. Bracket 52 carries at the upper portion thereof stud 54 around which and in pivotal relation thereto is passed a resilient bell hammer arm 55, which terminates at its upper extremity in finger 56, and carries at its lower end bell hammer or striker 57. Stud 58 projects from bracket or plate 52 at a point intermediate the stud 54 and gong 59, which is carried by bracket 52, and adjacent the lower edge thereof. Finger 56 of bell hammer 55 lies in the path of movement of studs 64 carried by rack bar 40. A tractile spring 62, having one of its ends fastened to stud 63 carried by bracket 52 with its opposite end fastened to finger 56 of the bell hammer arm 55, tends to normally hold the bell hammer arm in contact with stud 58, which stud is so positioned on the plate 52 with relation to the gong 59 and the pivotal point 54 of the arm 55 as to normally hold the striker 57 in spaced relation to gong 59.

From the foregoing description it will be readily seen that as rack bar 40 moves upwardly in the operation of the pump studs 64 carried by rack bar 40 will successively engage the finger 56 of bell hammer arm 55, moving the finger 56 upwardly against the tension of spring 62 until the stud 64 will move out of engagement with finger 56, when spring 62 will cause the bell hammer arm 55 to snap downwardly striking against the stud 58 causing the arm to flex, which will result in the hammer 57 striking the gong 59 with a quick sharp stroke, the hammer 57 being immediately withdrawn from contact with the gong 59 by reason of the resiliency of bell hammer arm 55.

My audible signal or indicator is adapted to operate synchronously with the visible indicator shown in detail in Fig. 7, the latter comprising one or more rotatable drums 65 having on the periphery thereof numerals to be exposed to view through the sight glass 66 of the enclosing casing for the purpose of indicating the quantity of liquid pumped at any single operation. In the type of pump shown in Figs. 4 and 5, five units or gallons will be discharged at each single continuous movement of the piston and the registering disc or discs 65 may be arranged to indicate any desired quantity to be pumped at a single operation. I prefer to provide two of the discs like that designated by reference character 65 to be suitably connected for operation in registering quantities pumped at a single operation up to one hundred gallons under which conditions each of the two discs 65 would be provided on their peripheries with the numerals 0 to 9 inclusive so that the numerals exposed through the sight glass would register continuously from 0 to 9 inclusive and then repeat. Numerals 0 to 5 will be brought into view beneath the sight glass 66 progressively and synchronously with the sounding of gong 59 as the finger of the bell hammer 55 is tripped in succession by the five pins 64 carried by the rack bar 40 in the movement of the rack bar and plunger rod to their limit of upward movement. Disc or discs 65 will be provided with suitable clutch or ratchet mechanism for resetting to 0 when the pump has measured and delivered the desired quantity of liquid. This will be accomplished by means of the knob 65* connected with the disc, which may be rotated by the operator as it is accessible on the exterior of the casing as shown in Fig. 4. Shaft 67 mounted in bearings 68 carries at its upper end worm 69 meshing with gear 70 and carries at its lower end worm gear 72 in mesh with worm 73 mounted on the main pump operating shaft 43. The details of the connection of the indicating disc or discs 65 with the shaft 71 and with the resetting knob 65ᵃ are not shown since this feature is old and well known in registering devices and forms no part of the present invention. In order to prevent the registering mechanism just described from being operated in the reverse direction when the pump handle 42 and associated gearing is reversed for returning the pump plunger at the conclusion of the delivery stroke of the piston a suitable ratchet connection, as indicated in dotted lines in Fig. 7, may be introduced between the worm wheel 73 and the main crank shaft 43 on which it is mounted for causing the worm wheel 73 to be positively rotated with the shaft during the pumping operation and to be disconnected therefrom during the reversal movement of the pump plunger.

In Figs. 8 and 9 I have shown diagrammatically within casing 75, portions of which casing are broken away, a pump of the two rack bar plunger operating type having two rack bars 76 and 77, a main driving shaft 78. Shaft 78 is operable by crank handle 79 and has rigidly affixed thereto spur gears 80, 81, which are adapted to mesh with the rack bars 76, 77 respectively for imparting reciprocal movement to the pump plunger rod, not shown. Driving shaft 78 carries at one of its ends bevelled gear 82 meshing with bevelled gear 83 on one end of shaft 84. Shaft 84 carries at its opposite end bevelled gear 85, meshing with bevelled gear 86 on one end of shaft 87, which last named shaft carries at its opposite end spur gear 88, meshing with spur gear 89 rigidly affixed to sleeve 90. Sleeve 90 has frictional engagement with shaft 91 carried therewithin. Shaft 91 carries at its opposite ends indicating pointers 92 and 93, which are rigidly affixed thereto and adapted to rotate around the faces of dials 94 and indicate the amount of oil or other liquid measured by the pump upon the respective dials graduated in gallons or other units of measurement measured by the pump. The indicating pointer shown in Fig. 8 is opposite the zero on the dial 94, indicating that the pump plunger is positioned at its lower limit of movement and in position to begin the pumping and measuring of oil or other liquid to be dispensed by the pump. The pump can be constructed of course, to register any number of units of measurement that may be desired, the denominations being numerically arranged around the outer edge of the dial to correspond with the progressive units of measurement of oil or other liquids measured by the pump, there being two indicating dials, one carried on either side of the pump casing and within the circular flanges 95, 96, in order that the visible indicator may be seen from either side of the pump. Shaft 91 carries at one of its ends knurled knob 97 for resetting the indicating pointers opposite the cipher after a predetermined amount of oil or other liquid has been measused and dispensed by the pump.

The structure last referred to and shown in Figs. 8 and 9 of the drawings is well known and forms no part of my invention, and a more detailed description thereof is not therefore deemed necessary.

I shall now describe another modification of my indicating gong or signal, which is applicable to the type of pump last referred to.

Sleeve 90 has rigidly mounted thereon drum 98 which is provided on its periphery with saw teeth 99. Affixed as at 100 to the lower portion and in vertical alignment with shaft 91 on supporting bracket 101 is placed a gong 102. Pivotally mounted on stud 103 carried by plate 101 and in approximately the same horizontal plane as shaft 91 is striker arm 104 which terminates at its upper extremity in finger 105 and carries at its lower end hammer or striker 106. As drum 98 is rotated by the actuation of the pump through movement of sleeve 90 the finger 105 will be depressed by the contact of the acute angled surface 107 of teeth 99 thereby forcing hammer arm 104 and striker 106 away from the gong against the tension of spring 108. The indicators 92 and 93 are so timed that at the instant the gallon or other desired unit of measurement is indicated the teeth 99 will release the outwardly forced hammer arm and the tension of the spring will force the arm into contact with stud 109, whereupon the arm 104 will flex causing the hammer 106 to strike the gong 102 a sharp quick stroke to sound the audible signal synchronously with its indication by the visible register.

In order that the invention might be understood the details of the preferred embodiment thereof as applied to commercial self measuring or dispensing pumps of three types has been illustrated and described, but it will be apparent to those skilled in the art that the invention in its broad aspect is capable of a wide application to automatic dispensing apparatus, and it is not desired to be limited to the details of construction or to the specific forms of apparatus to which the invention is shown applied herein, except as limited in the claims.

I claim:

1. A liquid dispensing and measuring device having a rack bar for actuating the device, studs carried by the rack bar, a gong carried adjacent the said rack bar, a striker arm operably related to the gong and adapted to be actuated by the engagement therewith by the studs of said rack bar.

2. A liquid dispensing and measuring device having a reciprocating rack bar for actuating the device, studs carried by the rack bar, a bracket carried by the device and adjacent the said rack bar, a gong carried by the bracket, a spring actuated striker arm pivotally mounted on the bracket, a stud carried by the bracket intermediate the pivotal point of the striker arm and the gong in such position as to normally hold the striker arm in spaced relation to the gong, the striker arm being adapted to be actuated by engagement therewith by the studs of said rack bar.

3. A liquid dispensing and measuring device having a reciprocating rack bar for actuating the device, studs carried by the rack bar, a bracket carried by the device and adjacent the rack bar, a gong carried by the bracket, a striker arm made of spring metal and pivotally mounted in said bracket in operable relation to the gong, said striker arm terminating in a projecting portion and in the path of movement of the studs, a tractile spring affixed at one of its ends to the bracket and engaging the extended portion of the striker arm with its opposite end, and a stud carried by the bracket intermediate the pivotal point of the striker arm and the gong in such position as to normally hold the striker arm in spaced relation to the gong.

4. A liquid dispensing and measuring device having a reciprocating, actuating rack bar, studs carried by the rack bar, a bracket carried by the device and adjacent the rack bar, a gong carried by the bracket, a stud carried by the bracket and spaced from the gong, a striker arm made of spring metal passing around the stud and protruding into the path of movement of the studs carried by the rack bar, a stud carried by the bracket intermediate the pivotal point of the striker arm and the gong and in such position as to normally hold the striker arm in spaced relation to the gong, a tractile spring affixed to the bracket with one of its ends and engaging the protruding portion of the striker arm with its other end and normally holding the striker arm in contact with the stud intermediate the pivotal point of the striker arm and the gong.

In testimony whereof I have signed my name to this specification on this 23rd day of November A. D. 1921.

CLARENCE W. MENSING.